(12) United States Patent
Moberg

(10) Patent No.: US 11,577,408 B2
(45) Date of Patent: Feb. 14, 2023

(54) COMPRESSIBLE SUCTION CUP HAVING ADDITIONAL VACUUM COMPARTMENT, AS WELL AS LIP, AND BELLOWS THEREFOR

(71) Applicant: PIAB Aktiebolag, Täby (SE)

(72) Inventor: Johan Moberg, Täby (SE)

(73) Assignee: PIAB Aktiebolag, Täby (SE)

( * ) Notice: Subject to any disclaimer, the term of this patent is extended or adjusted under 35 U.S.C. 154(b) by 0 days.

(21) Appl. No.: 17/086,682

(22) Filed: Nov. 2, 2020

(65) Prior Publication Data
US 2021/0283787 A1    Sep. 16, 2021

(30) Foreign Application Priority Data

Mar. 12, 2020  (EP) ...................................... 20162778
Oct. 12, 2020  (EP) ...................................... 20201370

(51) Int. Cl.
    *B25J 15/06*    (2006.01)
(52) U.S. Cl.
    CPC ................................. *B25J 15/0683* (2013.01)
(58) Field of Classification Search
    CPC .. B25J 15/0616; B25J 15/0683; B66C 1/0231
    USPC ......................................................... 294/189
    See application file for complete search history.

(56) References Cited

U.S. PATENT DOCUMENTS

| | | | | |
|---|---|---|---|---|
| 3,656,794 A * | 4/1972 | McCord | ................... | B65B 35/18 |
| | | | | 294/184 |
| 3,901,502 A * | 8/1975 | Vits | ....................... | B66C 1/0212 |
| | | | | 271/103 |
| 4,589,648 A * | 5/1986 | Hancock | ............... | B65H 3/0883 |
| | | | | 271/104 |
| 4,600,229 A | 7/1986 | Oten | | |
| 4,707,012 A | 11/1987 | Takagi | | |
| 5,192,070 A * | 3/1993 | Nagai | .................. | B25J 15/0616 |
| | | | | 271/90 |
| 6,527,323 B2 * | 3/2003 | Nagai | .................. | B25J 15/0616 |
| | | | | 294/189 |
| 2006/0012089 A1 | 1/2006 | Beck | | |

(Continued)

FOREIGN PATENT DOCUMENTS

GB      2281281      3/1995
JP      S57-6114     1/1982

OTHER PUBLICATIONS

Search Report issued by EUIPO for corresponding European Patent Application No. 20201370.2 dated Jan. 18, 2021.

*Primary Examiner* — Dean J Kramer
(74) *Attorney, Agent, or Firm* — Renner, Otto, Boisselle & Sklar, LLP

(57) ABSTRACT

A suction cup for engaging and lifting an object is disclosed, comprising a lip, a bellows, and an upper portion sealingly connected to the bellows for connecting an inner volume of the suction cup to a source of vacuum, which cup, in an operative state, is capable of being locked in an at least partly compressed state of the lip and/or bellows. Locking is accomplished by air entrapped in a sealed exterior volume formed between the lip and bellows and/or between one or more segments of the bellows in an operative state being evacuated through one or more through open holes provided in the lip and/or bellows when vacuum is connected to the suction cup. A corresponding lip and a corresponding bellows for use in the suction cup are also disclosed.

11 Claims, 4 Drawing Sheets

(56) References Cited

U.S. PATENT DOCUMENTS

2012/0025053 A1  2/2012  Tell
2017/0275104 A1  9/2017  Tell

* cited by examiner

COMPRESSIBLE SUCTION CUP HAVING ADDITIONAL VACUUM COMPARTMENT, AS WELL AS LIP, AND BELLOWS THEREFOR

This application claims priority of European Patent Application No. 20 162 778.3 filed Mar. 12, 2020 and European Patent Application No. 20 201 370.2 filed Oct. 12, 2020, which are hereby incorporated by reference.

FIELD OF THE INVENTION

The present invention relates to a suction cup for engaging and lifting an object, comprising a lip, a bellows, and an upper portion sealingly connected to the bellows for connecting an inner volume of the suction cup to a source of vacuum, which cup, in an operative state, is capable of being locked in an at least partly compressed state of the lip and/or bellows. Locking is accomplished by air entrapped in a sealed exterior volume formed between the lip and bellows and/or between one or more segments of the bellows in an operative state being evacuated through one or more through open holes provided in the lip and/or bellows when vacuum is connected to the suction cup. The present invention also relates to a corresponding lip, and a corresponding bellows, respectively, for use with the suction cup.

BACKGROUND ART

Suction cups are frequently used in automated industry for engaging and lifting various objects by means of using a reduced pressure in the suction cup. A suction cup may also be referred to as a vacuum pad. Conventionally used suction cups may also comprise a bellows, such as e.g. for enhanced compressibility and flexibility of the suction cup.

Many suction cups tend to lose their stability and friction when lifting objects at about ⅓ of their maximum load limit. Some cups, for example friction cups, heavily depend on being fully compressed to maximize their friction. A friction cup may typically include a hub which is rigidly connected to the upper attachment portion of the cup. If the hub of a friction cup loses contact with the object, a major source of friction and stability is lost. Since the hub can be considered as almost rigid, if the upper portion of the cup is displaced upwards from the original actuated position in relation to the object to be lifted, the contact between hub and object may be lost. In this state the cup is less stable, and also produces significantly less friction.

Figure 1:
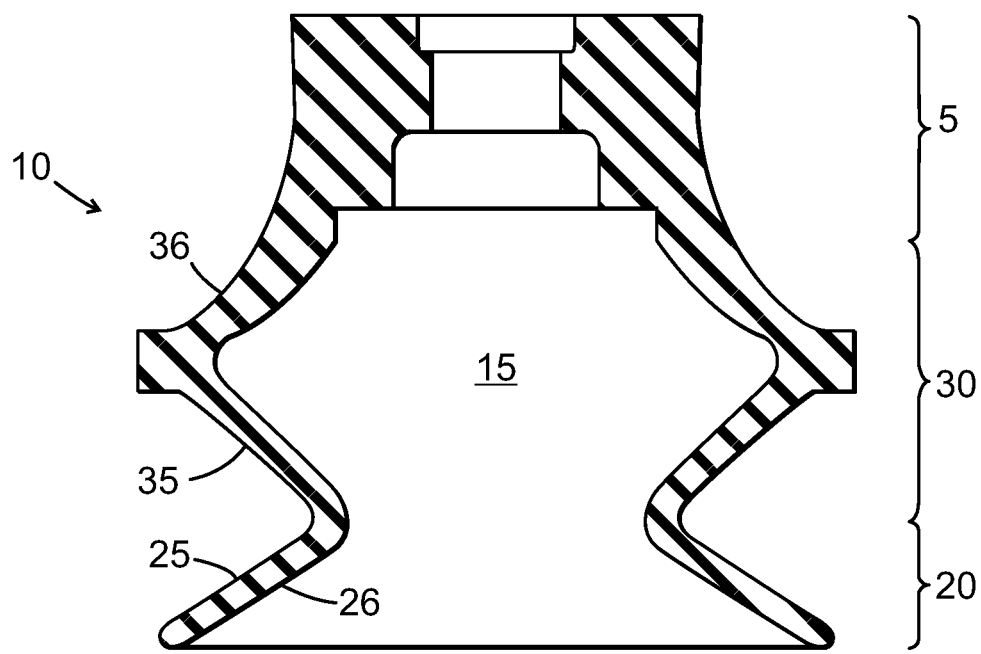
Figure 2:
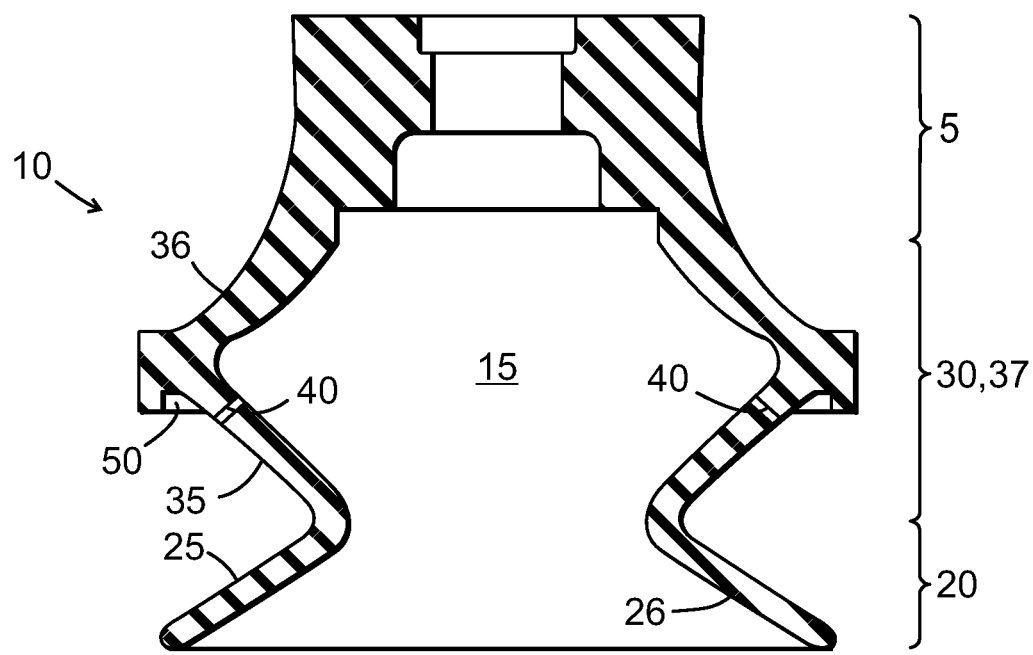

U.S. Pat. No. 4,600,229 discloses a vacuum cup having a convoluted bellows, which cup is stated to have increased holding force without increasing the overall size of the cup or level of vacuum, as compared to suction cups of the prior art as shown in FIGS. 1, and 2 therein. The suction cup disclosed therein is provided with an annular volume extending from the main cavity of the cup over the bellows when in the collapsed operative state. Adjacent external surfaces of the bellows convolutes are provided with complementary ridges and grooves which interlock when the bellows is in the collapsed operative state. The cup may also include means for reducing slipping. In the collapsed operative state the vacuum cup disclosed in U.S. Pat. No. 4,600,229 will however be fully compressed, as can be seen from FIG. 4 therein, and will consequently be very rigid. Also, the vacuum cup disclosed in U.S. Pat. No. 4,600,229 requires for its function a workpiece stop member (also referred to as a hub in the art). When high forces are exerted by the stop member on workpiece surface, marking or indentations may result from the hub.

SUMMARY OF THE INVENTION

In some applications it would be desirable to be able to lock the suction cup in a fully or partly compressed state, while retaining a certain degree of flexibility of the suction cup in such locked compressed state.

It is an object of the present invention to provide a suction cup which is capable of being locked in an at least partly compressed state, and which suction cup should provide for improved flexibility in such compressed state.

Preferably, the risk of marking a surface of an object by a suction cup should be able to be avoided.

According to the present invention, for a conventional suction cup 10 of the preamble of claim 1 comprising: a lip 20; a bellows 30 comprising at least one compressible bellows segment 37 comprising an upper exterior surface 36, and lower exterior surface 35, said bellows being sealingly connected to the lip; and, an upper portion 5, sealingly connected to the bellows, for connecting an inner volume 15 of the suction cup to a source of vacuum, wherein an opposing upper exterior surface 25 of the lip and an opposing lower exterior surface 35 of the bellows, and/or an opposing lower exterior surface 35 of an upper segment 37 of the bellows, and an opposing upper exterior surface 36 of an adjacent lower segment 37 of the bellows are capable of being compressed against each other into a compressed state, the above object has been accomplished by means of the following distinguishing features, which are set forth in the characterizing portion of claim 1, according to which at least one through open hole 40 is provided in at least one of said opposing surfaces, said at least one through open hole being in fluid connection with the inner volume of the suction cup, and a raised sealing portion 50 is provided in at least one of said opposing surfaces, which raised sealing portion is capable of forming a seal between opposing surfaces in a compressed state of the suction cup.

Accordingly, in one aspect the invention relates to such suction cup.

Depending on the positioning of the one or more through open holes and of the one or more raised sealing portions, one or more pair of opposing surfaces (25; 35 and/or 36; 35) will be able to be locked in a compressed state. At least one through open hole is required for any given pair of opposing surfaces, in order for the surfaces to be able to be locked in a compressed state. Also, at least one raised sealing portion is required for any given pair of opposing surfaces, in order for the surfaces to be able to be locked in a compressed state.

In some embodiments, in order to allow for the lip to retain its flexibility in an actuated state of the suction cup, the lip is made non-lockable to the bellows.

The present invention allows for a delayed, or slower relaxation of the suction cup from an actuated compressed state back to a relaxed non-compressed state. Thereby, a possible risk of damaging an object 100 by a sudden expansion of the suction cup upon release of an object can be minimized.

The inventive suction cup does not rely on a hub 60 for its locking capability. The inventive suction cup can thus avoid the risk of causing marking or indentation on a surface of an object. In embodiments not including a hub, the force exerted by the suction cup on a surface of an object can be located to the outer area of the lip, which is less harsh to the surface of an object. Also, a risk of leakage of ambient air into the suction cup from under the lip can thereby be minimized. Moreover, the absence of a hub allows for better engagement of non-flat surfaces, e.g. concave surfaces. In embodiments wherein a hub is absent, and the lip does not exhibit raised frictional elements 27 in its lower engagement surface 26, reduced loss of vacuum area upon leakage can be accomplished.

In certain embodiments, however, a hub 60 is included in order to provide for improved friction of the suction cup against a surface of an object 100 to be engaged by the cup.

Moreover, as opposed to the cup disclosed in U.S. Pat. No. 4,600,229, the inventive cup does not rely on an upper annular volume for its locking capability. In preferred embodiments the upper portion 5 of the inventive suction cup is capable of providing for flexibility in the upper portion of the inventive suction cup.

The inventive suction cup can be made such as to allow for a greater degree of displacement of the upper portion, bellows, or the lip, or a combination of any thereof, in an actuated state of the suction cup, until maximum lifting force of the cup is obtained.

Also, since an upper annular volume, and a hub are not required according to the present invention, and since a mounting plate, when present, does not have to be as wide (as an upper annular volume, such as according to U.S. Pat. No. 4,600,229), the inventive suction cup can be made more light-weight, and less complex, than a prior art suction cup.

In one embodiment of the inventive suction cup the lip is detachable from the bellows.

Consequently, in another aspect, the invention relates to a compressible lip 20 for an embodiment of the inventive suction cup 10, which lip has an upper exterior surface 25, and a lower engagement surface 26, said lip having a raised sealing portion 50 in the upper exterior surface of the lip.

In yet an aspect the invention relates to a compressible bellows 30 for an embodiment of the inventive suction cup 10, said bellows comprising at least one bellows segment 37 comprising an upper exterior surface 36, and a lower exterior surface 35, wherein at least one through open hole 40 is provided in at least one of said surfaces, and a raised sealing portion 50 is provided in at least one of said surfaces 35; 36 of the bellows.

Further embodiments and advantages of the invention will be apparent from the following detailed description and appended claims.

The term "upper", e.g. as used herein in upper exterior surface, is intended to refer to a position more distant to an object 100 to be engaged.

The term "lower", e.g. as used herein in lower exterior surface, is intended to refer to a position more proximal to an object 100 to be engaged.

The terms "segment" and "bellows segment" have been used interchangeably herein to refer to a section of a bellows comprising an upper exterior surface, and a lower exterior surface. A bellows, in turn, comprises one or more segments.

BRIEF DESCRIPTION OF THE ATTACHED DRAWINGS

FIG. 1 shows a conventional suction cup 10 including an upper portion 5, a lip 20, and a bellows 30.

FIG. 2 shows an embodiment of the inventive suction cup 10 in a relaxed state. The bellows 30 of the embodiment shown comprises only one segment 37. The embodiment shown includes two open through holes 40 and a raised sealing portion 50 formed in a lower exterior surface 35 of bellows 30.

Figure 3:
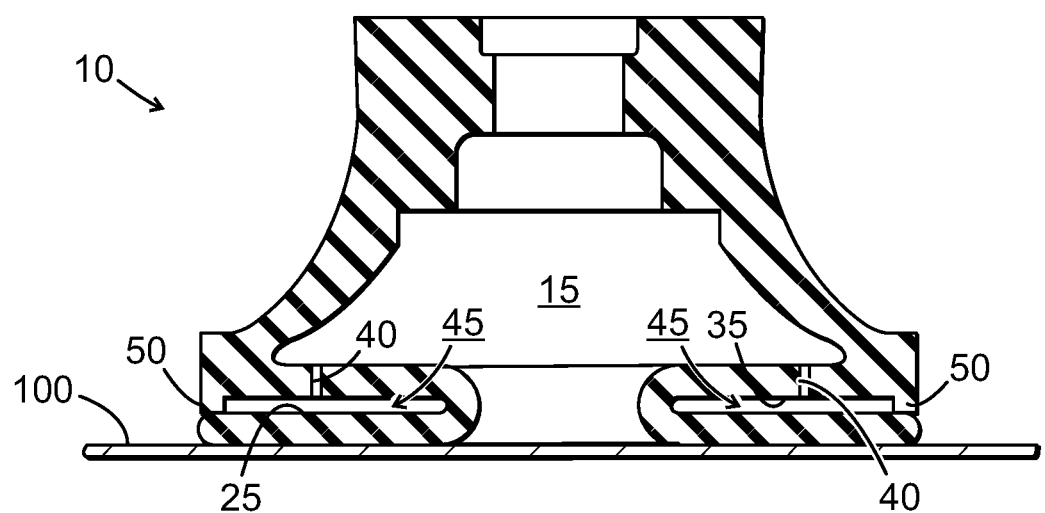

FIG. 3 shows the inventive suction cup 10 of FIG. 2 in an actuated compressed state against object 100 (in this case a flat, dry steel plate), wherein raised portion 50 forms a seal between opposing surfaces 25 and 35, said seal sealing a sealable compartment 45, which stands in fluid communication with the inner volume 15 via the open through holes 40.

Figure 4:
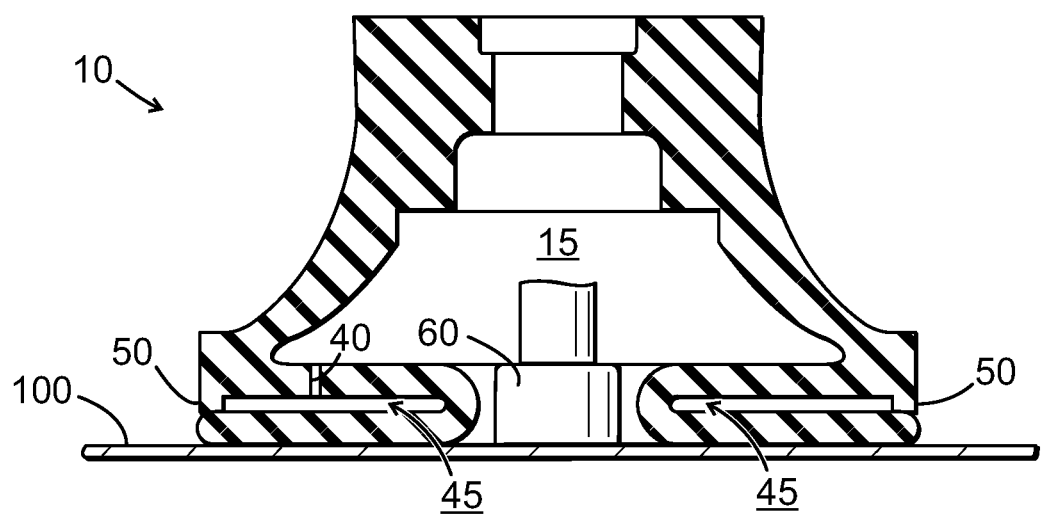

FIG. 4 shows an embodiment of the inventive suction cup 10 having a hub 60, which cup is in an actuated compressed state.

Figure 5:
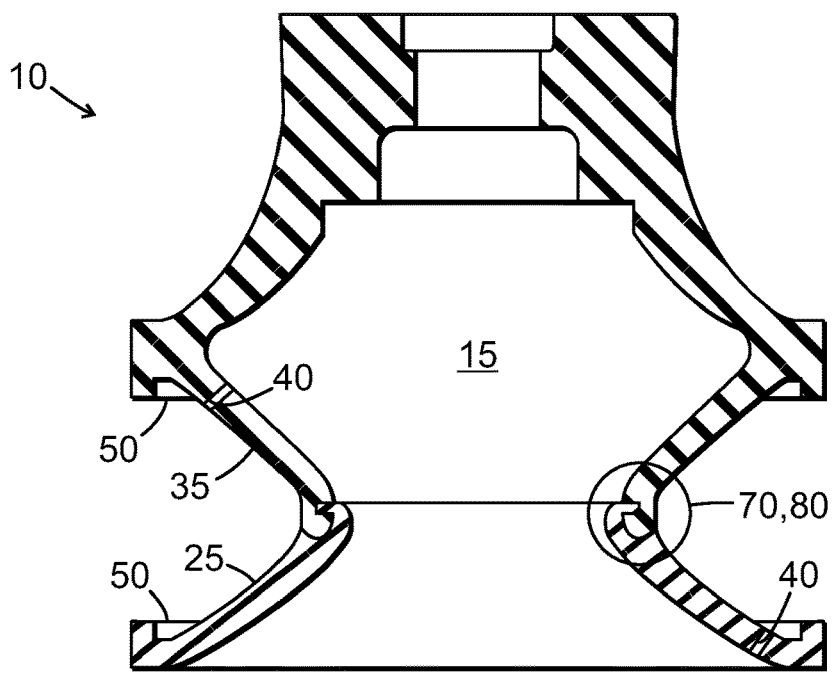

FIG. 5 shows an embodiment of the inventive suction cup 10, wherein the lip 20 is detachable from the bellows 30 by means of attachment means 70, 80 being provided on lip and bellows, respectively, and wherein both lip and bellows exhibit a through open hole 40.

Figure 6:
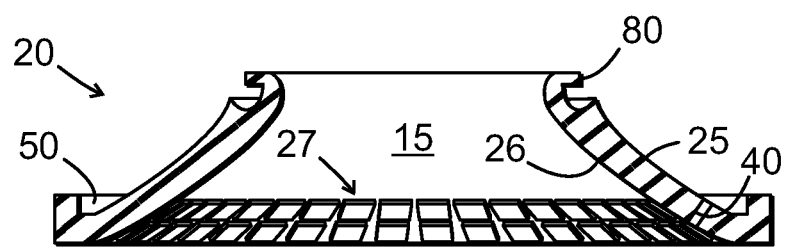

FIG. 6 shows an embodiment of an inventive lip 20, corresponding to the lip in FIG. 5. The embodiment of the lip shown in FIG. 6 exhibits raised frictional elements 27 in its lower engagement surface 26.

Figure 7:
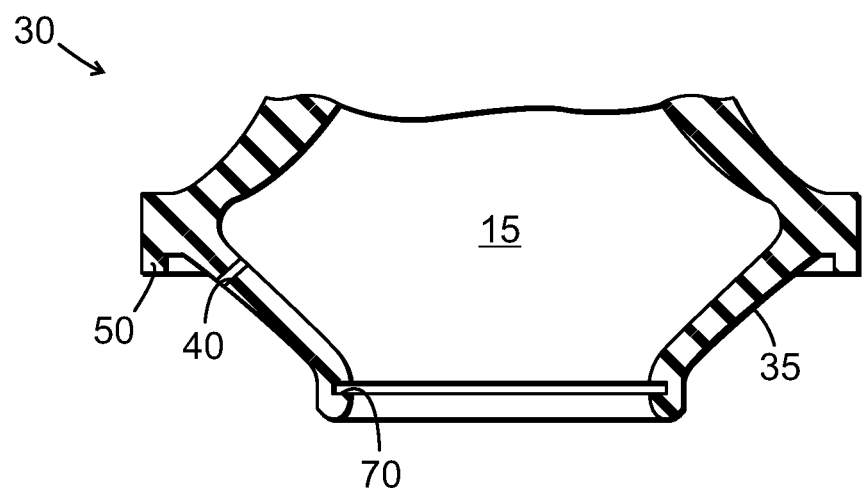

FIG. 7 shows an embodiment of an inventive bellows 30, corresponding to the bellows in FIG. 5, from which bellows the upper portion 5 has been cut away. The bellows 30 of the embodiment shown comprises only one segment 37.

Figure 8:
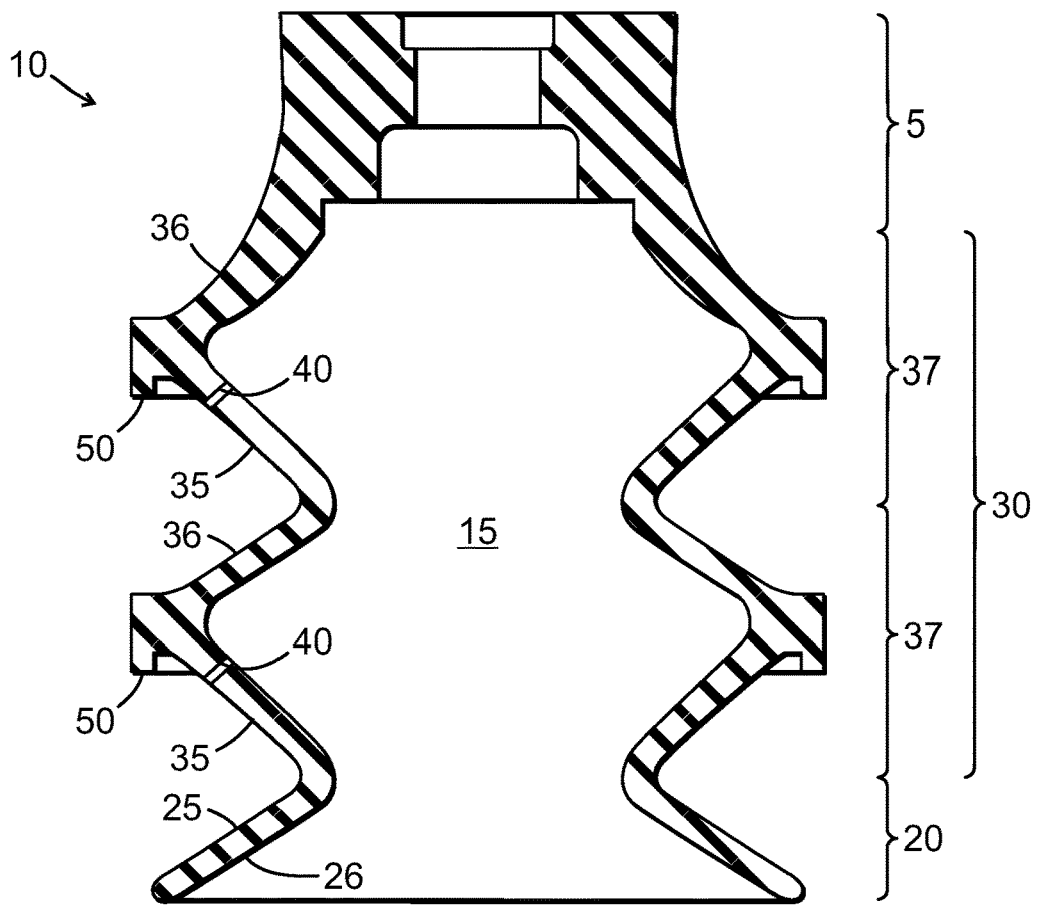

FIG. 8 shows an embodiment of an inventive suction cup 10 having a bellows 30 comprising adjacent upper, and lower, respectively, compressible bellows segments 37.

DETAILED DESCRIPTION OF THE INVENTION

Depending on the positioning of the one or more through open holes 40 and of the one or more raised sealing portions 50, one or more pair of opposing upper and lower surfaces will be able to be locked in a compressed state. At least one through open hole is required for any given pair (25; 35, 36; 35) of opposing upper and lower surfaces, in order for the surfaces to be able to be locked in a compressed state. Also, at least one raised sealing portion is required for any given pair of opposing upper and lower surfaces, in order for the surfaces to be able to be locked in a compressed state.

By the forming, in a compressed state of the suction cup 10, of a sealable compartment 45 between opposing upper exterior surface 25 of the lip 20 and the opposing lower exterior surface 35 of the bellows 30, such as shown in FIG. 3, and by the provision of a through open hole 40 through which the compartment can be evacuated into the inner volume 15, the suction cup can be locked in the compressed state when connected to vacuum. Embodiments of the inventive suction cup wherein the lip and lower (or lower-most, in a case where there is more than one segment) exterior surface of the bellows can be locked in a compressed state, such as explained above, will provide for improved maximum lifting force, and improved contact of the lip, and, when present, also of a hub, with an object to be engaged or lifted, thereby increasing the friction between suction cup and object.

In embodiments wherein the bellows 30 comprises at least an upper segment 37, and an adjacent lower segment 37, such as shown in FIG. 8, a sealable compartment 45 (not shown) could be formed between the opposing upper exterior surface 36 of the lower segment 37, and the opposing lower exterior surface 35 of the upper segment 37, similarly as the sealable compartment 45 formed between the lip and bellows as shown in FIG. 3, in a compressed state of the suction cup 10, thereby enabling locking of two adjacent segments of the bellows in a compressed state.

The raised sealing portion 50 can be located on the opposing upper exterior surface, on the opposing lower exterior surface, or on both said surfaces. The raised sealing portion is preferably located at the periphery of said surface, or surfaces, such as shown in FIGS. 2-8, for maximum stability, friction, and locking force. The geometrical shape of the cross-section of a sealing portion 50 is not critical as long as a tight seal can be formed with the opposite surface, or, with an opposing mating raised sealing portion 50, which is provided in the opposite surface. For example, in the case of an essentially rectangular cross-section of the raised sealing portion 50, an outer concentric raised portion 50 can be provided on one opposing surface to mate with an inner concentric raised portion provided on the other opposing surface (not shown). Thereby, certain movement can be allowed for in the sealing portion without breaking the seal or loosing vacuum from the sealable compartment. Also, improved radial stability can be accomplished.

In embodiments wherein the lip can be locked to the opposing lower surface of the bellow according to the invention as described above, the at least one through open hole 40 is provided in the upper exterior surface of the lip, in the lower exterior surface of the bellows, or in both. In preferred embodiments, the inventive at least one through open hole 40 is provided in the lower exterior surface of the bellows, since a reduction in the level of vacuum will occur in the region surrounding the through open hole. Also, a hole provided in the lip might more easily get occluded, or contaminated, thereby compromising its proper and intended functioning. Additionally, in instances wherein the lip is exposed to wear and tear, and, especially when made relatively thin, a hole provided in the lip may make the lip more vulnerable to cracking in the vicinity of the hole. For these reasons a hole in the lip is preferably avoided according to the invention. However, in alternative generally less preferred embodiments, such as for the purpose of enhanced ease of production, the at least one through open hole 40 is provided in the lip. In embodiments wherein the lip exhibits a through open hole 40, it is preferred that the hole is located between raised frictional elements 27, such as shown in FIG. 6, or in a recess in lower engagement surface 26.

The open through hole 40 is required to be small in order to avoid a significant pressure loss in the cup, in a case where the raised sealing portion 50 separates from the opposing surface, so that vacuum is lost from the sealable compartment, and ambient air is flowing in to the inner volume 15 via through open hole 40. On the other hand, a larger through open hole is believed to provide a more effective evacuation of the sealable compartment on actuation of the cup, and can reduce the risk of separation of sealing portion 50 from the opposing surface, and hence reduce the risk of loss of vacuum from the sealable compartment. A larger through open hole could also be advantageous in a case where leaking ambient air has to be evacuated from the compartment, such as in a case where dust or the like is present at the sealing surface, preventing a tight seal.

Typically, the cross-sectional area of a small through open hole 40 will be within the range of 0.5-1 mm$^2$.

The through open hole stands in fluid connection with the inner volume of the suction cup at all times. Thereby, a pressure differential across the hole will create a flow of ambient air through the through open hole, such as when the suction cup is actuated. Accordingly, a means configured to open and/or close the hole, is not used according to the invention.

In preferred embodiments including a lip capable of being locked to the bellows, especially when a thin lip is desired, the inventive raised sealing portion 50 is provided on the bellows (and not on the lip).

The raised sealing portion 50 preferably also prevents the opposing exterior surfaces, 25, and 35, respectively, forming the sealable compartment 45, from contacting each other when the sealable compartment is evacuated, as shown in FIG. 3. Similarly, a raised sealing portion 50 preferably also prevents opposing exterior surfaces, 35, and 36, such as included in an embodiment such as shown in FIG. 8, from contacting each other when the sealable compartment 45 formed between said surfaces is evacuated.

In certain embodiments of the inventive suction cup 10, the lip 20 is detachable from the bellows 30, such as shown in FIG. 5. Means for rendering a lip and a bellows detachable from each other, such as to allow for replacement of merely a lip, are known in the art, and will not be described in detail herein. As an example, however, such means are illustrated herein by means 70; 80, wherein attachment means 70 is provided on the bellows, and corresponding attachment means 80 is provided on the lip, as shown in FIG. 6 and FIG. 7, respectively. In such embodiments the invention is believed to markedly reduce the lifting stress on the connecting means between lip and bellows, i.e., with reference to the embodiment shown in FIG. 5, the attachment means 70, 80, and hence to reduce the risk of undesired detachment of the lip from the bellows.

When the inventive suction cup is returning to its relaxed state, ambient air flows through the through open hole allowing the raised sealing portion 50 to separate from the opposing surface.

The inventive suction cup can be made of any conventionally used material in compressible suction cups known in the art. Such materials are preferably flexible polymeric materials.

LIST OF REFERENCE NUMERALS USED

5 upper portion of suction cup
10 suction cup
15 inner volume
20 lip
25 upper exterior surface of lip
26 lower surface of lip
27 raised frictional elements
30 bellows
35 lower exterior surface of bellows
36 upper exterior surface of bellows
37 compressible bellows segment
40 through open hole
45 sealable compartment, also referred to as additional vacuum compartment
50 raised sealing portion
60 hub
70, 80 attachment means
100 object to be engaged by suction cup

The invention claimed is:

1. A suction cup for engaging and lifting an object, said suction cup comprising:
   a lip;
   a bellows comprising at least one compressible bellows segment comprising an upper exterior surface and a lower exterior surface, said bellows being sealingly connected to the lip; and, an upper portion, sealingly connected to the bellows, for connecting an inner volume of the suction cup to a source of vacuum,
wherein
an opposing upper exterior surface of the lip and an opposing lower exterior surface of the bellows, and/or
an opposing lower exterior surface of an upper segment of the bellows and an opposing upper exterior surface of an adjacent lower segment of the bellows
are configured to be compressed from a relaxed non-compressed state to against each other into a compressed state,
wherein at least one through open hole is provided in at least one of said opposing upper and lower surfaces, said at least one through open hole being in fluid connection with the inner volume of the suction cup, and
wherein a raised sealing portion is provided in at least one of said opposing upper and lower surfaces, said raised sealing portion being configured to form a sealed compartment between the opposing surfaces in the compressed state of the suction cup that stands in fluid communication with the inner volume via the through open hole.

2. The suction cup of claim 1, wherein the lip and bellows are detachable from each other.

3. The suction cup of claim 1, additionally comprising a hub.

4. The suction cup of claim 1, wherein at least one through open hole is provided in the opposing upper exterior surface of the lip, and/or in the opposing lower exterior surface of the bellows, and wherein the raised sealing portion is provided in at least one of said opposing upper and lower surfaces, said raised sealing portion being capable of forming a seal between said opposing surfaces in the compressed state of the suction cup.

5. The suction cup of claim 4, wherein said at least one through open hole is provided in the opposing lower exterior surface of the bellows, and not in the lip.

6. The suction cup of claim 4, wherein said raised sealing portion is provided in an opposing lower exterior surface of the bellows, and not in an opposing upper exterior surface of the lip.

7. The suction cup of claim 1, wherein both surfaces of a pair of opposing lower and upper surfaces exhibit a raised sealing portion.

8. The suction cup of claim 1, wherein a lower engagement surface of the lip exhibits frictional elements.

9. A compressible bellows for use in a suction cup having a lip having an upper exterior surface, a bellows detachable from the lip, and an upper portion sealingly connected to the bellows for connecting an inner volume of the suction cup to a source of vacuum, wherein the compressible bellows comprises:
at least one bellows segment comprising an upper exterior surface and a lower exterior surface,
wherein the at least one bellows segment is configured such that
the upper exterior surface of the lip opposes the lower exterior surface of the at least one bellows segment, and/or
a lower exterior surface of an adjacent upper bellows segment of the at least one bellows segment opposes the upper exterior surface of the at least one bellows segment,
when said opposing upper and lower exterior surfaces are compressed from a relaxed non-compressed state to against each other into a compressed state;
wherein at least one through open hole is provided in at least one of said upper and lower exterior surfaces of the at least one segment, said at least one through open hole being configured to be in fluid communication with the inner volume of the suction cup; and
wherein a raised sealing portion is provided in at least one of said upper and lower exterior surfaces of the at least one bellows segment, said raised sealing portion being configured to form a sealed compartment between the opposing surfaces in the compressed state of the suction cup that stands in fluid communication with the inner volume via the through open hole.

10. The compressible bellows of claim 9, wherein the at least one bellows segment comprises at least an upper bellows segment, and an adjacent lower bellows segment, each of which comprises an upper exterior surface, and a lower exterior surface, wherein the at least one through open hole is disposed on at least one of the upper exterior surface of the lower bellows segment and the lower exterior surface of the upper bellows segment, and wherein the at least one raised sealing portion is disposed on at least one of the lower exterior surface of the upper segment and the upper exterior surface of the lower segment.

11. The compressible bellows of claim 9, in combination with the lip, bellows, and upper portion, and wherein the compressible bellows is sealingly connected to the upper portion for use as the suction cup.

* * * * *